United States Patent
Song et al.

(10) Patent No.: US 8,207,961 B2
(45) Date of Patent: Jun. 26, 2012

(54) 3D GRAPHIC PROCESSING DEVICE AND STEREOSCOPIC IMAGE DISPLAY DEVICE USING THE 3D GRAPHIC PROCESSING DEVICE

(75) Inventors: Myoung-Seop Song, Yongin-si (KR);
Jang-Doo Lee, Yongin-si (KR);
Hyoung-Wook Jang, Yongin-si (KR);
Hag-Keun Kim, Gunpo-si (KR);
Duck-Myung Lee, Seoul (KR);
Han-Jun Choi, Seongnam-si (KR);
Hyun-Sook Kim, Yongin-si (KR);
Woo-Jong Lee, Seoul (KR)

(73) Assignees: Samsung Mobile Display Co., Ltd., Yongin (KR); Nexuschips Co., Ltd., Seoul (KR)

( * ) Notice: Subject to any disclaimer, the term of this patent is extended or adjusted under 35 U.S.C. 154(b) by 175 days.

(21) Appl. No.: 11/480,646

(22) Filed: Jul. 3, 2006

(65) Prior Publication Data

US 2007/0008313 A1    Jan. 11, 2007

(30) Foreign Application Priority Data

Jul. 5, 2005 (KR) .................. 10-2005-0060212

(51) Int. Cl.
*G06T 15/00* (2011.01)
*H04N 13/00* (2006.01)
*G03B 35/00* (2006.01)
*G03B 21/00* (2006.01)

(52) U.S. Cl. ................. 345/419; 348/42; 352/57; 353/7
(58) Field of Classification Search .................. 345/419; 348/42; 352/57; 353/7
See application file for complete search history.

(56) References Cited

U.S. PATENT DOCUMENTS

| 4,601,053 | A | * | 7/1986 | Grumet | 382/106 |
| 4,896,210 | A | * | 1/1990 | Brokenshire et al. | 348/51 |
| 5,255,211 | A | * | 10/1993 | Redmond | 703/6 |

(Continued)

FOREIGN PATENT DOCUMENTS

CN    1277698 A    12/2000

(Continued)

OTHER PUBLICATIONS

European Search Report for corresponding patent application No. 06116595.7-2002 dated Nov. 2, 2006.

(Continued)

*Primary Examiner* — David T Welch
(74) *Attorney, Agent, or Firm* — Christie, Parker & Hale, LLP

(57) ABSTRACT

A stereoscopic image display device for displaying a three dimensional (3D) stereoscopic image in real-time by using a 3D graphic contained within a 2D image. The stereoscopic image display device includes a controller, a 3D graphic processor, a driver, and a display unit. The controller receives 3D graphic data and a synchronization signal, and outputs a control signal and the 3D graphic data. The 3D graphic processor generates a plurality of stereoscopic matrices used to generate 3D stereoscopic image data for a plurality of viewing points according to the control signal, and transforms the 3D graphic data into 3D stereoscopic image data using the plurality of stereoscopic matrices. The driver generates a driving signal based on the image data output from the 3D graphic processor and the output control signal. The display unit displays an image corresponding to the image data according to the driving signal.

18 Claims, 3 Drawing Sheets

U.S. PATENT DOCUMENTS

| | | | |
|---|---|---|---|
| 5,581,665 A | | 12/1996 | Sugiura et al. |
| 5,864,342 A | | 1/1999 | Kajiya et al. |
| 5,959,663 A | * | 9/1999 | Oba et al. .................... 348/46 |
| 5,982,375 A | | 11/1999 | Nelson et al. |
| 6,011,581 A | * | 1/2000 | Swift et al. .................... 348/58 |
| 6,014,472 A | * | 1/2000 | Minami et al. ............... 382/285 |
| 6,094,216 A | | 7/2000 | Taniguchi et al. |
| 6,108,005 A | | 8/2000 | Starks et al. |
| 6,172,686 B1 | * | 1/2001 | Mizutani ...................... 345/564 |
| 6,175,379 B1 | | 1/2001 | Uomori et al. |
| 6,477,267 B1 | | 11/2002 | Richards |
| 6,496,183 B1 | | 12/2002 | Bar-Nahum |
| 6,515,662 B1 | * | 2/2003 | Garland ........................ 345/427 |
| 6,593,959 B1 | | 7/2003 | Kim et al. |
| 6,624,813 B1 | * | 9/2003 | Wang ............................ 345/441 |
| 6,631,205 B1 | * | 10/2003 | Melen et al. .................. 382/154 |
| 6,640,004 B2 | | 10/2003 | Katayama et al. |
| 7,058,252 B2 | | 6/2006 | Woodgate et al. |
| 7,371,163 B1 | | 5/2008 | Best |
| 7,391,417 B2 | | 6/2008 | Osako |
| 7,545,380 B1 | | 6/2009 | Diard et al. |
| 2001/0020946 A1 | * | 9/2001 | Kawakami et al. ........... 345/582 |
| 2001/0043226 A1 | | 11/2001 | Visser et al. |
| 2002/0105484 A1 | * | 8/2002 | Navab et al. ..................... 345/8 |
| 2002/0154214 A1 | | 10/2002 | Scallie et al. |
| 2002/0191000 A1 | * | 12/2002 | Henn ............................ 345/619 |
| 2002/0196251 A1 | | 12/2002 | Duluk, Jr. et al. |
| 2003/0048354 A1 | | 3/2003 | Takemoto et al. |
| 2003/0160780 A1 | | 8/2003 | Lefebvre et al. |
| 2004/0004616 A1 | | 1/2004 | Konya et al. |
| 2004/0027452 A1 | * | 2/2004 | Yun et al. ........................ 348/51 |
| 2004/0032980 A1 | * | 2/2004 | Harman ........................ 382/154 |
| 2004/0169670 A1 | | 9/2004 | Uehara et al. |
| 2004/0212612 A1 | | 10/2004 | Epstein et al. |
| 2004/0239685 A1 | | 12/2004 | Kiyokawa et al. |

FOREIGN PATENT DOCUMENTS

| | | |
|---|---|---|
| CN | 1496177 A | 5/2004 |
| EP | 0 583 060 A2 | 2/1994 |
| EP | 0 583 060 A3 | 2/1994 |
| EP | 0 607 000 A2 | 7/1994 |
| EP | 0 751 689 A2 | 1/1997 |
| EP | 0 751 689 A3 | 1/1997 |
| EP | 0 963 122 A2 | 12/1999 |
| EP | 1 406 456 A2 | 4/2004 |
| EP | 1 406 456 A3 | 1/2006 |
| JP | 03-119889 | 5/1991 |
| JP | 04-077882 | 3/1992 |
| JP | 07-322305 | 12/1995 |
| JP | 09-074573 | 3/1997 |
| JP | 10-232953 | 9/1998 |
| JP | 2001-155182 | 6/2001 |
| JP | 2002-024856 | 1/2002 |
| JP | 2002-519792 | 7/2002 |
| JP | 2003-047027 | 2/2003 |
| JP | 2003-070022 | 3/2003 |
| JP | 2003-169351 | 6/2003 |
| JP | 2004-120165 | 4/2004 |
| JP | 2004-165710 | 6/2004 |
| JP | 2004-280078 | 10/2004 |
| JP | 2004-289681 | 10/2004 |
| JP | 2005-011275 | 1/2005 |
| KR | 10-0239132 | 10/1999 |
| KR | 10-2001-0023290 | 3/2001 |
| KR | 10-2003-0088513 | 11/2003 |
| KR | 10-0456952 | 11/2004 |
| KR | 10-2005-0078737 | 8/2005 |
| WO | WO 97/23097 | 6/1997 |
| WO | WO 98/43442 | 10/1998 |
| WO | WO 00/00934 | 1/2000 |
| WO | WO 2004/051307 A2 | 6/2004 |
| WO | WO 2005/013623 A1 | 2/2005 |

OTHER PUBLICATIONS

Korean Patent Abstract, Publication No. 100239132 B1, Published on Oct. 19, 1999, in the name of Kim.

European Search Report dated Nov. 10, 2006, for EP application 06118463.6, noting listed references in this IDS, namely, U.S. Patent 6,175,379 and EP 0 963 122.

U.S. Office action dated Mar. 10, 2009, for related U.S. Appl. No. 11/499,424, noting listed U.S. references in this IDS, namely U.S. Patents 6,108,005, 6,477,267 and U.S. Publication 2004/0239685.

European Search Report dated Oct. 24, 2006, for European application 06116598.1, noting European and WO references, as well as U.S. Publication 2003/0048354 listed in this IDS.

U.S. Office action dated Dec. 23, 2008, for related U.S. Appl. No. 11/480,730, noting U.S. Publication 2001/0043226 listed in this IDS.

U.S. Office action dated Jun. 11, 2009, for related U.S. Appl. No. 11/480,730, noting U.S. Patent 6,640,004 listed in this IDS.

U.S. Office action dated Sep. 25, 2009, for related U.S. Appl. No. 11/499,424, noting U.S. Patent 7,391,417 listed in this IDS.

U.S. Office action dated Nov. 17, 2010, for cross-reference U.S. Appl. No. 11/480,730 noting listed references in this IDS.

U.S. Office action dated Oct. 4, 2010, for cross-reference U.S. Appl. No. 11/499,424, noting listed references in this IDS.

U.S. Office action dated Feb. 11, 2011, for cross reference U.S. Appl. No. 11/499,424.

U.S. Office action dated Jan. 21, 2010, for related U.S. Appl. No. 11/480,730, noting listed references in this IDS.

U.S. Office action dated Jul. 15, 2011, for cross-reference U.S. Appl. 11/499,424, 57 pages.

U.S. Office action dated Nov. 7, 2011, for cross-reference U.S. Appl. 11/499,424, 44 pages.

Japanese Office action dated Jun. 28, 2011, for Japanese Patent application 2006-171871, corresponding to cross-reference U.S. Appl. 11/480,730, 2 pages, Paragraph 0048 of cited reference 6 and Fig. 2 disclose a "mobile phone equipped with 3D face display device".

Takushi, I., *3D displayer that is unnecessary glasses, which is developed by a Sanyo*, Nikkei Electronics, Japan, Nikkei business Publications, Inc., Oct. 24, 1994, vol. 620, pp. 109-112.

Minoru, Y., *3D Television that is unnecessary glasses*, NHK Giken Dayori, Science and Technical Research Laboratories, Japan Broadcasting Corporation, Dec. 1, 1992, vol. 35, pp. 2-7, p. 2 discloses, "3D display without glasses", and Fig. 1 uses a "parallax barrier method".

* cited by examiner

3D GRAPHIC PROCESSING DEVICE AND STEREOSCOPIC IMAGE DISPLAY DEVICE USING THE 3D GRAPHIC PROCESSING DEVICE

CROSS-REFERENCE TO RELATED APPLICATION

This application claims priority to and the benefit of Korean Patent Application No. 10-2005-0060212 filed in the Korean Intellectual Property Office on Jul. 5, 2005, the entire contents of which are incorporated herein by reference.

BACKGROUND OF THE INVENTION (a) Field of the Invention

The present invention relates to a stereoscopic image display device, and more particularly, relates to a stereoscopic image display device for displaying a stereoscopic image by generating stereoscopic image data based on input 3D graphic data.

(b) Description of the Related Art

In general, human eyes are about 6.5 cm apart (Inter-Ocular Distance (IOD)), and therefore each eye has a slightly different view of an object. Since the distance between the left and right eyes causes a disparity of an image, we can perceive an image having a stereoscopic effect by assembling the disparity in our brain. This principle is basically applied to produce a three dimensional (3D) image. For example, when the eyes observe a hexahedral object, our brain perceives a similar object from images of the hexahedral object that are respectively observed by the left and right eyes. In addition, we can feel a depth of the object by perceiving a parallax difference caused by the differently observed images of the left and right eyes (i.e., we can perceive the stereoscopic effect).

In the prior art relating to stereoscopic images, a left eye image and a right eye image are separately generated when contents are produced, and a stereoscopic image display device receives stereoscopic image data generated by compounding the left eye and right eye images. Therefore, 2D image contents and 3D stereoscopic image contents are typically produced separately. In addition, since a 3D stereoscopic image display device should independently store the 3D stereoscopic image contents, a size of a storage unit may be problematically increased.

Korean Patent No. 239132 discloses a three dimensional disparity drawing device and a method thereof. In this patent, a method for generating a left eye image and a right eye image with reference to a z coordinate address and an x coordinate address is disclosed. However, according to the patent, the left eye and right eye images are produced according to a depth of an object regardless of a stereoscopic shape thereof since the left eye and right eye images are produced from the 2D image. Accordingly, performance of providing a stereoscopic effect may be limited, and the image may be distorted with respect to a realistic stereoscopic image.

Therefore, it is difficult to make 3D stereoscopic image display devices available for general use because of the difficulties in producing the 3D stereoscopic image contents as described above.

Therefore, in order to commercialize a stereoscopic image display device, a stereoscopic image display device for displaying a 3D stereoscopic image by using input 2D image contents including a 3D graphic which includes depth information and surface information of an object, should be developed.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention is to provide a stereoscopic image display device for displaying a 3D stereoscopic image in real-time by using a 3D graphic contained within a 2D image, and to provide a 3D graphic processing device for generating a 3D stereoscopic image in real-time by using the 3D graphic contained within the 2D image.

An exemplary stereoscopic image display device according to an embodiment of the present invention includes a controller, a 3D graphic processor, a driver, and a display unit. The controller receives three dimensional (3D) graphic data and a synchronization signal, and outputs a control signal and the 3D graphic data. The 3D graphic processor generates a plurality of stereoscopic matrices used to generate 3D stereoscopic image data for a plurality of viewing points according to the control signal, and transforms the 3D graphic data into 3D stereoscopic image data using the plurality of stereoscopic matrices. The driver generates a driving signal based on the 3D stereoscopic image data output from the 3D graphic processor and the control signal. The display unit displays an image corresponding to the 3D stereoscopic image data according to the driving signal.

The 3D graphic processor may include a geometric engine, a rendering engine, and a frame memory. The geometric engine generates triangle shaped image coordinates for a plurality of viewing points by performing an operation on the stereoscopic matrices and the 3D graphic data when the 3D graphic data and the control signal are received. The rendering engine generates image data among the 3D stereoscopic image data for the respective viewing points by rendering the generated image coordinates for the plurality of viewing points. The frame memory stores the generated image data for the respective viewing points in each frame.

The geometric engine may include an image index counter, a matrix generator, and a matrix calculator. The image index counter outputs an image index indicating the image data for a currently processed viewing point among the plurality of viewing points. The matrix generator generates the plurality of stereoscopic matrices corresponding to the respective image data after receiving the image index and a 3D transformation matrix for displaying the 3D graphic data as a two-dimensional (2D) image. The matrix calculator outputs the image coordinate after performing the operation on the matrices output by the matrix generator and the 3D graphic data.

An exemplary three dimensional (3D) graphic processing device according to an embodiment of the present invention may include a left/right index counter, a matrix generator, a first multiplexer, a matrix calculator, and a request signal outputting unit. The left/right index counter outputs a left/right index indicating whether an image being processed is a left eye image or a right eye image. The matrix generator generates a left eye stereoscopic matrix or a right eye stereoscopic matrix according to the left/right index, a 3D transformation matrix for displaying 3D graphic data as a 2D image, and a user selection parameter. The first multiplexer receives the stereoscopic matrix and the 3D transformation matrix, selects one matrix among the received stereoscopic matrix and the 3D transformation matrix based on an externally input 3D activation signal, and outputs the selected matrix. The matrix calculator outputs triangle shaped coordinate image data after performing an operation of the matrix output from the first multiplexer and the 3D graphic data. The request signal outputting unit outputs a draw command request signal for requesting a next draw command according to the left/right index and the 3D activation signal.

In an exemplary method for driving a stereoscopic image display device according to an embodiment of the present invention, a left eye stereoscopic matrix used to generate left eye image data is generated, and a right eye stereoscopic matrix used to generate right eye image data is generated. In such an exemplary method, the left eye image data and the right eye image data are generated by performing an operation on 3D graphic data and the respective left and right eye stereoscopic matrices.

DETAILED DESCRIPTION

Figure 1:
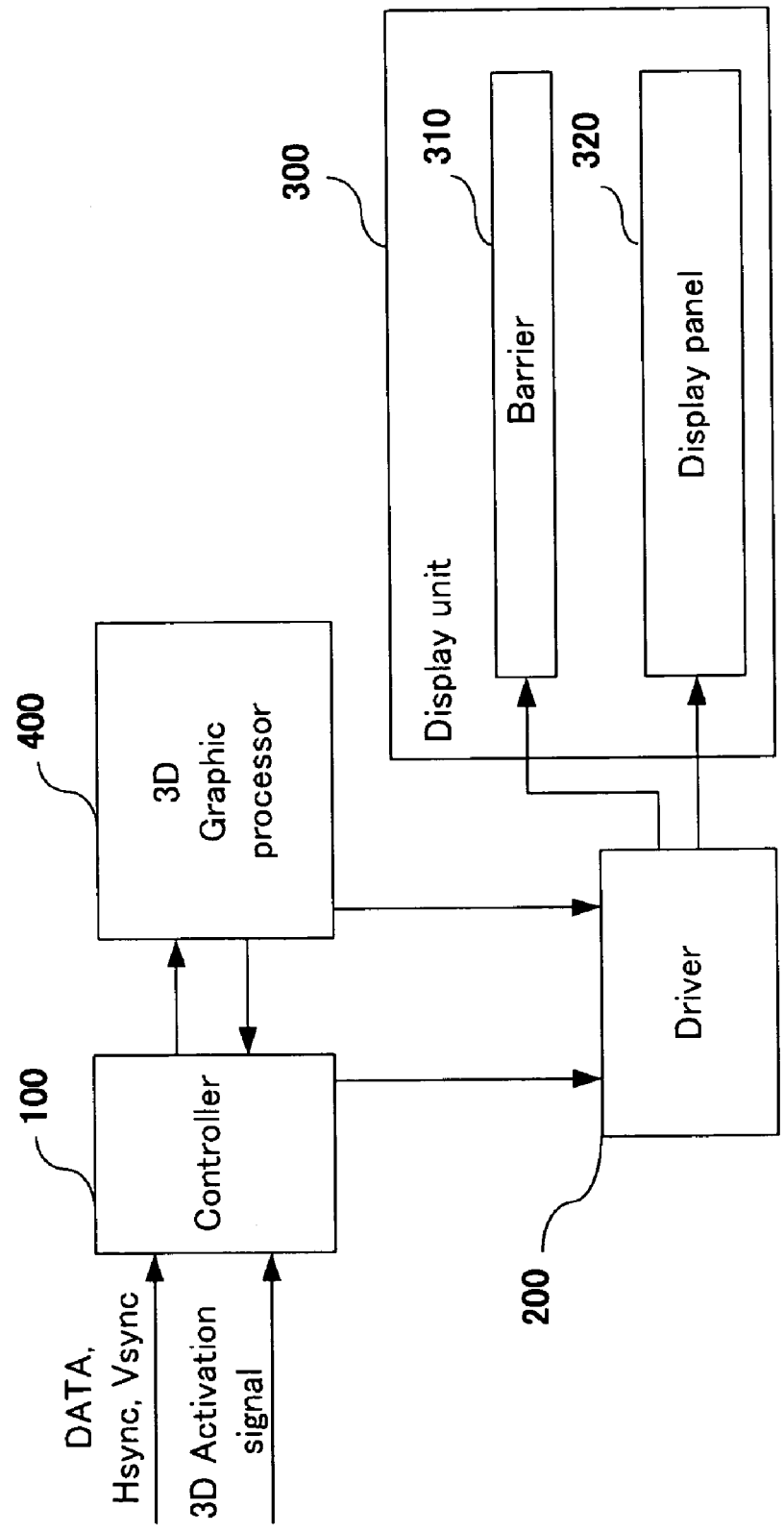
FIG. 1 shows a schematic block diagram of a stereoscopic image display device according to an exemplary embodiment of the present invention.

An exemplary embodiment of the present invention will hereinafter be described in detail with reference to the accompanying drawings.

In the following detailed description, only an exemplary embodiment of the present invention has been shown and described, simply by way of illustration. As those skilled in the art would realize, the described embodiment may be modified in various different ways, all without departing from the spirit or scope of the present invention. Accordingly, the drawings and description are to be regarded as illustrative in nature and not restrictive. Like reference numerals designate like elements throughout the specification.

In general, a three dimensional (3D) graphic contained within a two dimensional (2D) image is generated as a single-eye image (that is, an image seen to be the same by left and right eyes). That is, a 3D graphic image as a single-eye image is displayed by displaying image data on a corresponding pixel of a display panel. In this case, the image data is generated by multiplying a transformation matrix parameter according to a position of the single-eye by a basic coordinate of a 3D object.

However, it is generally required to provide images respectively seen by both eyes in order to process a 3D stereoscopic image. In addition, since a left eye image and a right eye image are different from each other, it is generally required to provide respective transformation matrix parameters for the left and right eyes.

In further detail, in order to generate the 3D stereoscopic image, image data seen by the left eye is generated by multiplying a matrix parameter for the left eye by the basic coordinate of the 3D object, and then, other image data seen by the right eye is generated by multiplying another matrix parameter for the right eye by the basic coordinate of the 3D object.

The left eye and right eye images are displayed on the display panel based on the generated left eye and right eye image data, and the left and right eyes may respectively perceive the left eye and right eye images through an optical device (e.g., a barrier) for separating the images displayed on the display panel into a left eye image and a right eye image. That is, a 3D stereoscopic image is displayed since one frame includes left eye image data and right eye image data.

A stereoscopic image display device for displaying a stereoscopic image by using the 3D graphic contained within the 2D image according to an exemplary embodiment of the present invention will now be described with reference to FIG. 1 to FIG. 3.

FIG. 1 shows a schematic block diagram of a stereoscopic image display device according to an exemplary embodiment of the present invention.

As shown in FIG. 1, the stereoscopic image display device includes a controller 100, a driver 200, a display unit 300, and a 3D graphic processor 400.

The controller 100 externally receives image data DATA, a horizontal synchronization signal Hsync, a vertical synchronization signal Vsync, and a 3D activation signal. The 3D activation signal may also be referred to as a control signal.

The image data DATA may include at least one of 2D image data, 3D graphic data, or 3D stereoscopic image data. In addition, while the 3D activation signal is externally input along with the image data DATA, as shown in FIG. 1, the 3D activation signal may alternatively be generated by the controller 100 according to a user selection. The controller 100 may also generate one or more other control signals using the image data DATA, the 3D activation signal and/or the synchronization signals to control the driver 200 and/or the 3D graphic processor 400.

When the 3D activation signal and the 3D stereoscopic image data are received, the controller 100 outputs the 3D stereoscopic image data along with the 3D activation signal to the driver 200, and when the 2D image data is received without the 3D activation signal, the controller 100 outputs the 2D image data to the driver 200.

In addition, when the 3D graphic data is received, the controller 100 transmits the 3D graphic data along with the input 3D activation signal or only the 3D graphic data to the 3D graphic processor 400.

The 3D graphic processor 400 processes the 3D graphic data so as to display the 3D graphic data on the display unit 300. In further detail, when the 3D graphic data is received along with the 3D activation signal from the controller 100, the 3D graphic processor 400 generates 3D stereoscopic image data based on the 3D graphic data, and when the 3D graphic data is received without the 3D activation signal, the 3D graphic processor 400 processes the 3D graphic data to be displayed as a 2D image. The 3D graphic processor 400 may be coupled to the controller 100 and driver 200 through an interface when the 3D graphic processor 400 is formed as a separate graphic acceleration chip. Alternatively, the 3D graphic processor 400 may be integrated with the controller 100 and/or the driver 200.

The 3D stereoscopic image data or the 3D graphic data (e.g., to be displayed as a 2D image) generated by the 3D graphic processor 400 is output to the driver 200.

The driver 200 drives a barrier 310 and a display panel 320 of the display unit 300 so as to selectively display the 2D image or the 3D stereoscopic image on the display unit 300 based on the data and the 3D activation signal received from the controller 100 or the 3D graphic processor 400. In further detail, when 2D image data is received from the controller 100 or 3D graphic data is received from the 3D graphic processor 400 without the 3D activation signal, the driver 200 drives the display panel 320 so as to display the 2D image based on the received data, and drives the barrier 310 so that the images of the display panel 320 may be entirely transmitted through the barrier 310. For this, the driver 200 generates one or more driving signals for driving the barrier 310 and the display panel 320 based on the image data.

In addition, when the 3D activation signal and the 3D stereoscopic image data are received from the controller 100 or the 3D activation signal and the 3D stereoscopic image data generated based on the 3D graphic data are received from the 3D graphic processor 400, the driver 200 drives the display panel 320 so as to display the 3D stereoscopic image on the display panel 320 based on the received 3D stereoscopic image data, and drives the barrier 310 so that the image displayed on the display panel 320 is selectively transmitted through the barrier 310. At this time, the image may be selectively transmitted through the barrier 310 since the barrier 310 includes a transparent region and an opaque region.

The display unit 300 selectively displays the 2D image or the 3D stereoscopic image based on an operation of the driver 200, and includes the barrier 310 and the display panel 320. The display panel 320 displays an image corresponding to the image data applied from the driver 200. The barrier 310 is an optical device for separating the 3D stereoscopic image displayed on the display panel 320 into left eye and right eye images based on the operation of the driver 200. In addition, the 2D image displayed on the display panel 320 by the operation of the driver 200 is transmitted through the barrier 310.

White a barrier is used for the optical device in the exemplary embodiment of the present invention, the present invention covers various optical devices. For example, a lens array may be used as the optical device instead of the barrier.

Accordingly, the stereoscopic image display device according to the exemplary embodiment of the present invention displays the 2D image on the display unit 300 without driving the 3D graphic processor 400 when the 2D image data is received, and displays the 3D stereoscopic image based on the input 3D stereoscopic image data when the 3D stereoscopic image data is received. In addition, when the stereoscopic image display device according to the exemplary embodiment of the present invention receives the 3D graphic data along with the 3D activation signal, the 3D graphic processor 400 generates the 3D stereoscopic image data based on the 3D graphic data, and the stereoscopic image display device displays the 3D stereoscopic image on the display unit 300 based on the generated 3D stereoscopic image data.

A configuration and an operation of the 3D graphic processor 400 for processing the 3D graphic data will now be described.

Figure 2:
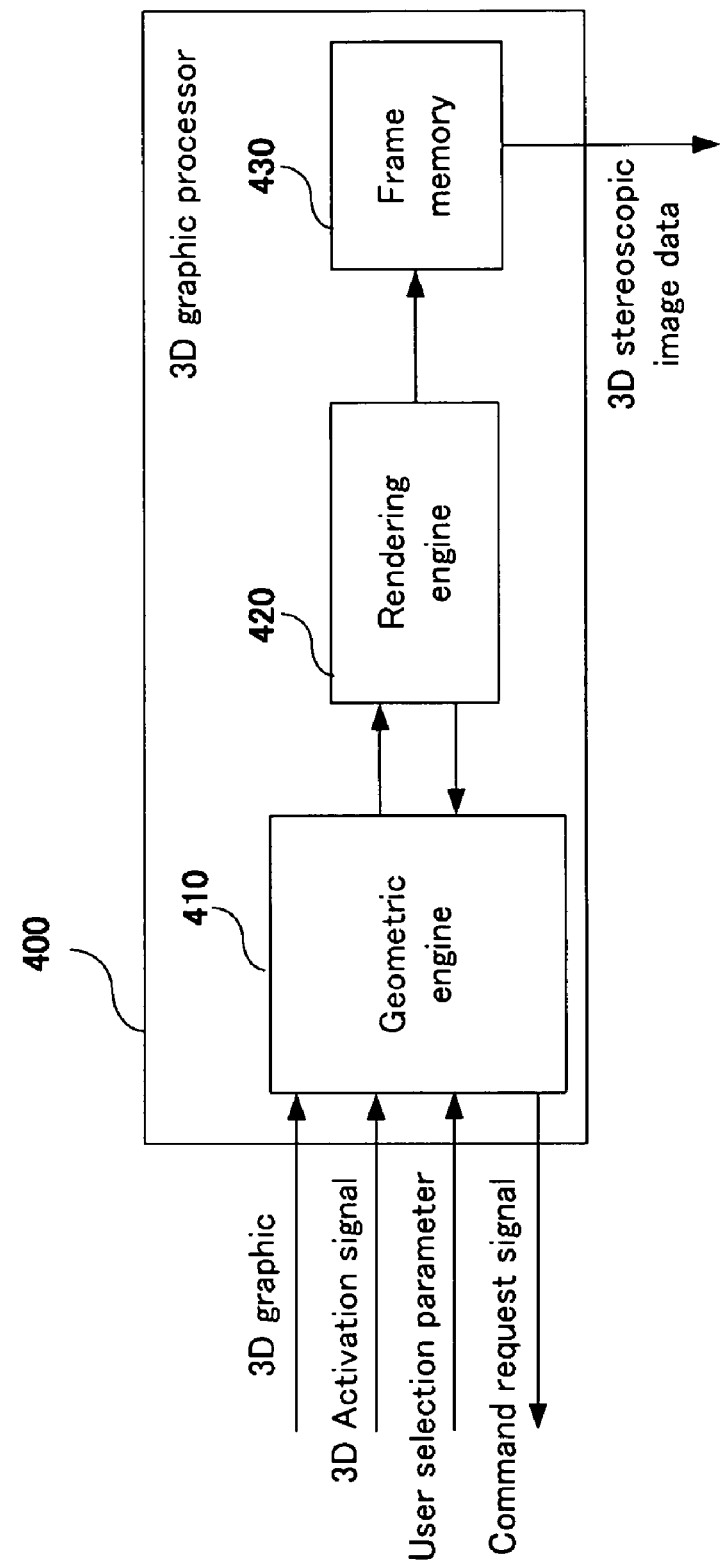
FIG. 2 shows a schematic block diagram of a 3D graphic processor in the stereoscopic image display device of FIG. 1.

FIG. 2 shows a schematic block diagram of the 3D graphic processor 400 in the stereoscopic image display device of FIG. 1.

As shown in FIG. 2, the 3D graphic processor 400 includes a geometric engine 410, a rendering engine 420, and a frame memory 430.

After receiving the 3D graphic data and the 3D activation signal, the geometric engine 410 generates left eye image data and right eye image data by converting an object formed as the 3D graphic into an object including scaling, shifting, rotating, and perspective effects. At this time, the conversion from the object formed as the 3D graphic into the object including scaling, shifting, rotating, and perspective effects is performed by an operation with parameters (e.g., a model view matrix, and a projection matrix) representing positions of the eyes. In addition, the geometric engine 410 receives parameters (e.g., spacing between the left and right eyes, forward angles of the left and right eyes, and/or a method for generating the left eye and the right eye images) according to a user's selection, and may generate the left eye image data and the right eye image data based on the received user selection parameters.

The rendering engine 420 generates the left eye image data and the right eye image data by rendering coordinates generated by the geometric engine 410.

The frame memory 430 stores the left eye image data and the right eye image data generated by the rendering engine 420 in each frame, and outputs 3D stereoscopic image data stored in each frame to the driver 200.

The 3D graphic processor may be implemented on a single chip including an interface for coupling the 3D graphic processor to the controller 100 in order to be used in a mobile terminal (or mobile device) for displaying the stereoscopic image. That is, the 3D graphic processor may be coupled to a controller of the mobile terminal by being implemented on a single separate chip. In other embodiments, the 3D graphic processor may be implemented on the same chip as the controller.

Figure 3:
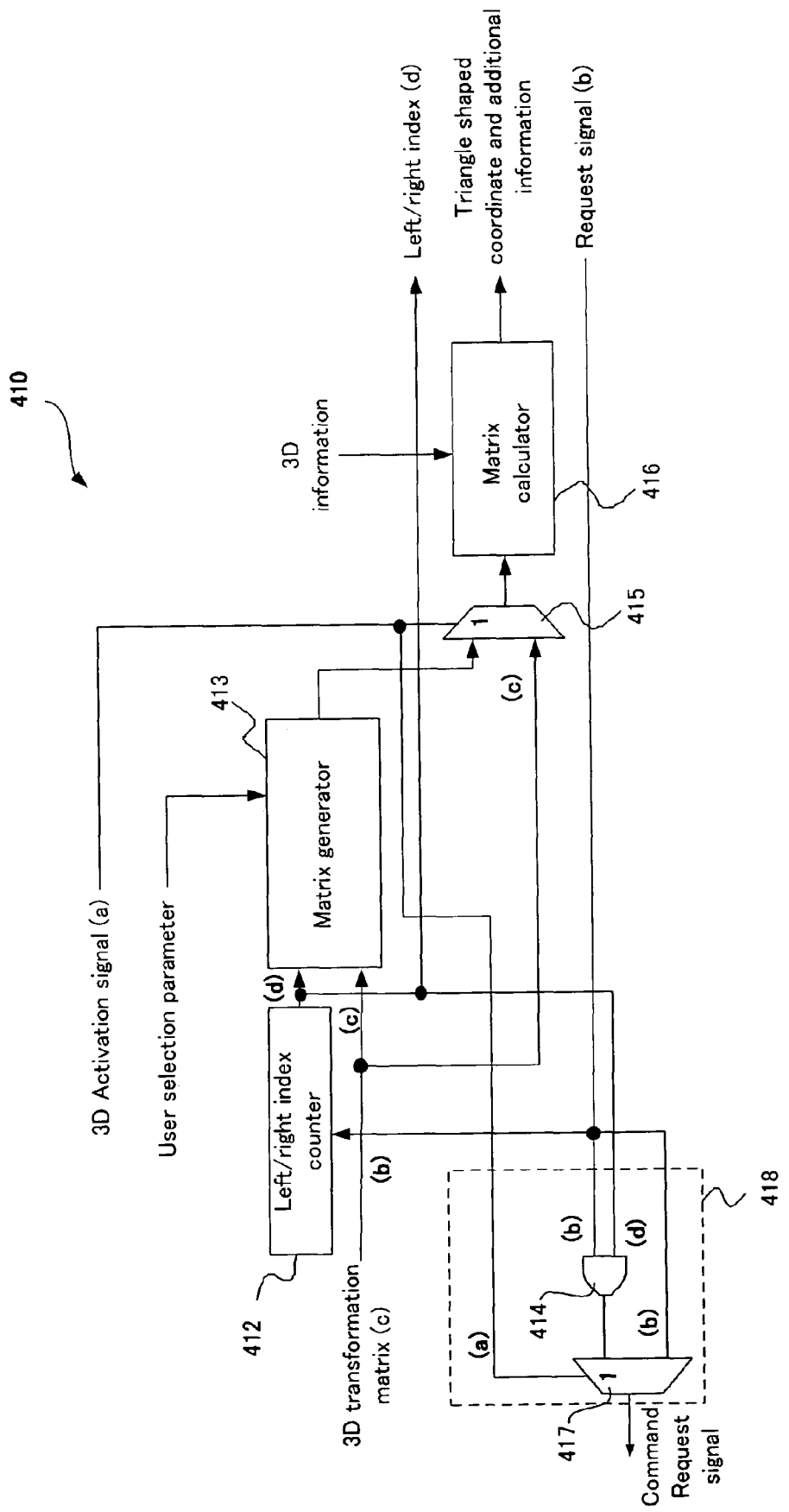
FIG. 3 shows a schematic block diagram of a geometric engine in the 3D graphic processor of FIG. 2.

FIG. 3 shows a schematic block diagram of the geometric engine 410 shown in FIG. 2.

As shown in FIG. 3, the geometric engine 410 includes a left/right index counter 412, a matrix generator 413, a multiplexer 415, a matrix calculator 416, and a command request signal output unit 418.

The left/right index counter 412 outputs a left/right index (d) to the rendering engine 420 (shown in FIG. 2), the matrix generator 413, and the command request signal output unit 418 based on a request signal (b) generated by the rendering engine 420 to request a next draw command. Here, the left/right index (d) indicates whether an image being processed is the left eye image or the right eye image.

The matrix generator 413 generates a left eye 3D transformation matrix and a right eye 3D transformation matrix based on a 3D transformation matrix (c) for drawing the 3D graphic and the user selection parameters. In further detail, when a signal indicating that the image being processed is the left eye image is received from the left/right index counter 412, the matrix generator 413 generates a left eye stereoscopic matrix for generating the left eye image based on the user selection parameters including spacing between the eyes, forward angles of the eyes, and method for generating an image, and when another signal indicating that the image being processed is the right eye image is received from the left/right index counter 412, the matrix generator 413 generates a right eye stereoscopic matrix for generating the right eye image based on the user selection parameters.

The multiplexer 415 outputs the left eye and right eye stereoscopic matrices generated by the matrix generator 413 when a 3D activation signal (a) in an activated state is received, and the multiplexer 415 outputs the 3D transformation matrix (c) when the 3D activation signal (a) in an inactivated state is received.

The command request signal output unit 418 includes an AND processor 414 and a multiplexer 417. After receiving the left/right index (d) of the left/right index counter 412 and the request signal (b), the AND processor 414 performs an AND operation on the received left/right index (d) and request signal (b), and outputs a result of the AND operation to the controller 100. The multiplexer 417 is an output terminal for requesting a draw command. In further detail, the multiplexer 417 outputs an output signal of the AND processor 414 when the 3D activation signal (a) is in the activated state, and outputs the request signal (b) when the 3D activation signal (a) is in the inactivated state. A signal output from the multiplexer 417 is transmitted to the controller 100.

The matrix calculator 416 outputs triangle shaped left/right eye coordinates and additional information after calculating a matrix selected and output by the multiplexer 415 with 3D information including vertex coordinate and texture coordinate information in the 3D graphic data.

The triangle shaped coordinate and additional information output from the matrix calculator 416 and the left/right index (d) of the left/right index counter 412 are input to the rendering engine 420 to be rendered, and therefore the left eye image data and the right eye image data are formed.

An operation of the geometric engine 410 will now be described.

First, the 3D activation signal in the activated state (i.e., the 3D activation signal is 1) will be described.

The left/right index counter 412 outputs the left/right index (d) indicating that the image being processed is the left eye image. Therefore, the 3D transformation matrix (c), the user selection parameters, and the left/right index (d) are input to the matrix generator 413. The matrix generator 413 generates the left eye stereoscopic matrix for generating the left eye image based on the 3D transformation matrix (c) and the user selection parameters. When the generated left eye stereoscopic matrix is received through the multiplexer 415, the matrix calculator 416 outputs the triangle shaped coordinate and additional information to the rendering engine 420 after calculating the left eye stereoscopic matrix with the 3D graphic data.

The AND processor 414 performs an operation of the left/right eye index (d) and the request signal (b). For example, the AND processor 414 outputs the request signal (b) when the left/right index (d) is 1, and the multiplexer 417 outputs the request signal (b) since the 3D activation signal (a) is 1, so that a next draw command request signal is output.

When the draw command request signal is received from the rendering engine 420, the left/right index counter 412 counts the draw command request signal and outputs the left/right index (d) indicating that the image being processed is the right eye image. Therefore, the 3D transformation matrix (c), user selection parameters, and the left/right index indicating the right eye image are input to the matrix generator 413, and the matrix generator 413 generates the right eye stereoscopic matrix for generating the right eye image.

The generated right eye stereoscopic matrix is output to the matrix calculator 416 through the multiplexer 415, and the matrix calculator 416 outputs the triangle shaped coordinate and additional information for the right eye image to the rendering engine 420 after performing an operation of the right eye stereoscopic matrix and the 3D graphic data.

In addition, since the 3D activation signal is in the activated state (i.e., the 3D activation signal is 1), the multiplexer 417 outputs the output signal of the AND processor 414 to the controller 100 so that the controller receives the next command.

Accordingly, the left eye matrix for generating the left eye image is provided first to the matrix calculator 416 after the 3D transformation matrix is transformed into the left eye matrix, and when the next draw command request signal is received, the right eye matrix for generating the right eye image is provided to the matrix calculator 416 after the 3D transformation matrix is transformed into the right eye matrix. Then, when the next draw command request signal (b) is received, the rendering engine 420 outputs the request signal (b) to the controller 100 through the geometric engine 410 so that the controller 100 receives the next command.

The 3D activation signal (a) in the inactivated state (i.e., the 3D activation signal (a) is 0) will now be described.

When the 3D activation signal (a) is 0, the multiplexer 415 outputs the 3D transformation matrix (c) for drawing the 3D graphic to the matrix calculator 416. Therefore, the matrix calculator 416 outputs the 3D graphic coordinate and additional information after performing an operation of the 3D graphic data and the 3D transformation matrix (c). In addition, the multiplexer 417 outputs the left/right index (d) since the 3D activation signal (a) is 0.

Accordingly, the stereoscopic image may be displayed by directly transmitting the 3D graphic data to the stereoscopic image display device without changing the software. In addition, various characteristics of respective users may be applied since the user selection parameters are used when the left/right eye stereoscopic matrices are generated.

In addition, the 3D graphic may be displayed as a 2D image or a 3D stereoscopic image since the transformation matrix for drawing the 3D graphic and the left/right eye stereoscopic matrices for the stereoscopic image may be selectively used by using the 3D activation signal.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims and their equivalents. For example, while the two-view parallax (left eye and right eye) stereoscopic image has been described in the exemplary embodiment of the present invention, the present invention may cover multi-view stereoscopic images. When a multi-view stereoscopic image is applied, the matrix calculator generates a plurality of matrices for generating respective multi-view images.

After directly receiving the 3D graphic, which is contained within the 2D image, the stereoscopic image display device according to the exemplary embodiment of the present invention may display the 3D stereoscopic image by transforming the received 3D graphic into the 3D stereoscopic image signal. Therefore, it is not required to generate additional image contents for displaying the 3D stereoscopic image, and the stereoscopic image may be displayed by transforming the 3D graphic in real-time.

In addition, the stereoscopic image display device according to the exemplary embodiment of the present invention may display the stereoscopic image according to user characteristics since a user may input the user selection parameters when the 3D graphic data is transformed to the 3D stereoscopic image data, the user selection parameters including spacing between the eyes, forward angles of the eyes, and method for generating the image.

The stereoscopic image display device according to the exemplary embodiment of the present invention may selectively display a 2D image or a 3D stereoscopic image by using the 3D activation signal.

What is claimed is:

1. A stereoscopic image display device comprising:
    a controller for receiving three-dimensional (3D) graphic data and a synchronization signal, and for outputting a control signal and the 3D graphic data including two-dimensional (2D) image data and 3D graphic information, such that the 3D graphic data is processed differently to be displayed as a 3D stereoscopic image or a 2D single eye image according to the control signal, wherein the 3D graphic information includes depth and surface information of an object;
    a 3D graphic processor for generating a plurality of stereoscopic matrices used to generate 3D stereoscopic image data for a plurality of viewing points according to the control signal, and transforming the 3D graphic data into the 3D stereoscopic image data using the plurality of stereoscopic matrices when the control signal indicates that the 3D stereoscopic image is to be displayed, and when the control signal indicates that the 2D single eye image is to be displayed, processing the 3D graphic data via a 3D transformation matrix for displaying the 2D single eye image;

a driver for generating a driving signal based on the image data output from the 3D graphic processor and the control signal; and a display unit for displaying an image corresponding to the image data according to the driving signal.

2. The stereoscopic image display device of claim 1, wherein the 3D graphic processor comprises:

a geometric engine for generating triangle shaped image coordinates for the plurality of viewing points by performing an operation on the stereoscopic matrices and the 3D graphic data when the 3D graphic data and the control signal are received;

a rendering engine for generating image data among the 3D stereoscopic image data for the respective viewing points by rendering the image coordinates for the plurality of viewing points; and a frame memory for storing the generated image data for the respective viewing points in each frame.

3. The stereoscopic image display device of claim 2, wherein the geometric engine comprises:

an image index counter for outputting an image index indicating the image data for a currently processed viewing point among the plurality of viewing points;

a matrix generator for generating the plurality of stereoscopic matrices corresponding to the respective image data after receiving the image index and the 3D transformation matrix for displaying the 3D graphic data as the 2D single eye image; and a matrix calculator for outputting the image coordinates after performing the operation on the matrices output by the matrix generator and the 3D graphic data.

4. The stereoscopic image display device of claim 3, wherein the matrix generator receives user selection parameters including at least one of spacing between eyes, forward angles of the respective eyes, or a method for generating an image, and generates the stereoscopic matrices using the user selection parameters.

5. The stereoscopic image display device of claim 4, wherein the 3D graphic processor further comprises a first multiplexer for receiving the stereoscopic matrices output by the matrix generator and the 3D transformation matrix, selecting one matrix among the received stereoscopic matrices and the 3D transformation matrix according to the control signal, and outputting the selected matrix to the matrix calculator.

6. The stereoscopic image display device of claim 5, wherein the matrix calculator is configured to generate and output:

the 3D stereoscopic image data after performing the operation on at least one of the stereoscopic matrices and the 3D graphic data; and the 2D image data for displaying the 3D graphic data as the 2D single eye image after performing an operation on the transformation matrix output from the matrix generator and the 3D graphic data.

7. The stereoscopic image display device of claim 3, wherein the matrix calculator outputs triangle shaped coordinate data as the image data.

8. The stereoscopic image display device of claim 3, further comprising a command request signal output unit for outputting a request signal for requesting a next draw command to the controller based on the image index and the control signal.

9. The stereoscopic image device of claim 1, wherein the stereoscopic matrices are generated based on the 3D transformation matrix.

10. The stereoscopic image display device of claim 1, wherein the controller receives the control signal from another device.

11. The stereoscopic image display device of claim 1, wherein the controller generates the control signal.

12. A three-dimensional (3D) graphic processing device comprising:

a left/right index counter for outputting a left/right index indicating whether an image being processed is a left eye image or a right eye image;

a matrix generator for generating a left eye stereoscopic matrix or a right eye stereoscopic matrix according to the left/right index, a 3D transformation matrix for displaying 3D graphic data as a two-dimensional (2D) single eye image, and a user selection parameter, the 3D graphic data including 2D image data and 3D graphic information, such that the 3D graphic data can be processed differently to be displayed as a 3D stereoscopic image or the 2D single eye image, wherein the 3D graphic information includes depth and surface information of an object;

a first multiplexer for receiving the stereoscopic matrices and the 3D transformation matrix, selecting one matrix among the received stereoscopic matrices and the 3D transformation matrix based on an externally input 3D activation signal, and outputting the selected matrix, wherein when the 3D activation signal has a first value, the 3D graphic data is processed via the left eye or right eye stereoscopic matrix for displaying the 3D graphic data as the 3D stereoscopic image, and when the 3D activation signal has a second value, the 3D graphic data is processed via the 3D transformation matrix for displaying the 3D graphic data as the 2D single eye image;

a matrix calculator for outputting triangle shaped coordinate image data after performing an operation on the matrix output from the first multiplexer and the 3D graphic data; and a request signal outputting unit for outputting a draw command request signal for requesting a next draw command according to the left/right index and the 3D activation signal when the 3D activation signal indicates that the 3D stereoscopic image is to be displayed.

13. The 3D graphic processing device of claim 12, further comprising an interface for coupling to a stereoscopic image display device for selectively displaying the 3D stereoscopic image or the 2D single eye image.

14. The 3D graphic processing device of claim 12, wherein the request signal outputting unit comprises:

an AND processor for receiving the request signal and the left/right index; and a second multiplexer for selecting between a request signal and an output of the AND processor according to the 3D activation signal, and outputting the selected signal.

15. A method for driving a stereoscopic image display device comprising:

generating a left eye stereoscopic matrix used to generate left eye image data;

generating a right eye stereoscopic matrix used to generate right eye image data;

outputting a three-dimensional (3D) transformation matrix used for displaying 3D graphic data as a two-dimensional (2D) image or the left and right eye stereoscopic matrices according to a 3D activation signal, the 3D graphic data including two-dimensional (2D) single eye image data and 3D graphic information, such that the 3D graphic data can be processed differently to be displayed as the 2D single eye image or a 3D stereoscopic image, wherein the 3D graphic information includes depth and surface information of an object; and when the left and right eye stereoscopic matrices are output, generating the left eye image data and the right eye image data by performing an operation on the 3D graphic data and the respective left and right eye stereoscopic matrices when the 3D activation signal indicates that the left eye image and the right eye image are to be displayed as the 3D stereoscopic image, and when the 3D activation signal indicates that the 2D single eye image is to be displayed, processing the 3D graphic data via the 3D transformation matrix for displaying the 2D single eye image.

16. The method of claim 15, further comprising when the transformation matrix is output, outputting the 2D image data after performing an operation on the transformation matrix and the 3D graphic data.

17. The method of claim 15, further comprising driving a display panel and a barrier near the display panel using the left eye image data and the right eye image data when the 3D activation signal is provided.

18. The method of claim 15, further comprising storing the left eye image data and the right eye image data in a frame memory.

* * * * *